United States Patent
Wu et al.

(10) Patent No.: US 9,926,455 B2
(45) Date of Patent: Mar. 27, 2018

(54) SOLDER MASK COMPOSITIONS FOR AEROSOL JET PRINTING

(71) Applicant: XEROX CORPORATION, Norwalk, CT (US)

(72) Inventors: Yiliang Wu, Oakville (CA); Kurt Halfyard, Mississauga (CA)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 15/340,896

(22) Filed: Nov. 1, 2016

(65) Prior Publication Data

US 2017/0044388 A1    Feb. 16, 2017

Related U.S. Application Data

(62) Division of application No. 14/595,814, filed on Jan. 13, 2015, now Pat. No. 9,540,529.

(51) Int. Cl.
*C09D 11/36* (2014.01)
*C09D 11/101* (2014.01)
*C09D 11/322* (2014.01)
*B05D 1/02* (2006.01)

(52) U.S. Cl.
CPC ............... *C09D 11/36* (2013.01); *B05D 1/02* (2013.01); *C09D 11/101* (2013.01); *C09D 11/322* (2013.01)

(58) Field of Classification Search
USPC ........................................... 347/20
See application file for complete search history.

(56) References Cited

U.S. PATENT DOCUMENTS

| | | | |
|---|---|---|---|
| 2002/0086914 A1* | 7/2002 | Lee ..................... | C09D 11/101 522/75 |
| 2005/0224764 A1* | 10/2005 | Ma .......................... | C09D 5/24 252/500 |
| 2007/0148338 A1* | 6/2007 | Dellrup .................... | B27G 1/00 427/140 |
| 2007/0270568 A1* | 11/2007 | Ushiki .................. | C08F 226/02 528/170 |
| 2011/0271870 A1* | 11/2011 | Otsubo .................. | C09D 11/18 106/31.13 |
| 2011/0305821 A1 | 12/2011 | Wu et al. | |

OTHER PUBLICATIONS

Lopez-Tobar, Eduardo, Stability of the Disulfide Bond in Cystine Adsorbed on Silver and Gold Nanoparticles as Evidenced by SERS Data, J. Phys. Chem. C2013, 117, 1531-1537.

(Continued)

*Primary Examiner* — Huan Tran
*Assistant Examiner* — Alexander D Shenderov
(74) *Attorney, Agent, or Firm* — Pillsbury Winthrop Shaw Pittman LLP (57) ABSTRACT

A solder mask ink for aerosol jet printing includes a metal oxide and a propylene glycol-based solvent; the solder mask ink has a viscosity from about 50 cps to about 1,000 cps at shear rate of 10 1/s at 25° C., and a shear thinning index from about 1.0 to about 2.0.

20 Claims, 4 Drawing Sheets

(56) References Cited

OTHER PUBLICATIONS

Sironmani, A. et al. (2011) Silver Nanoparticles—Universal Multifunctional Nanoparticles for Bio Sensing, Imaging for Diagnostic and Targeted Drug Delivery for Therapeutic Applications, Drug Delivery and Development—Present and Future, Dr. Izet Kapetanovic (Ed.), ISBN: 978-953-307-615-7, In Tech, http://www.intechopen.com/books/drug-discovery-and-development-present-and-future/silver-nanoparticles-universal-multifunctional-nanoparticles-for-bio-sensing-imaging-for-diagnostics.

Kneipp, K. et al. Surface-enhanced Raman scattering and biophysics, J. Phys.: Condens. Matter 14 (2002) R597-R624.

Lee, K et al., In Vivo Imaging of Transport and Biocompatibility of Single Silver Nanoparticles in Early Development of Zebrafish Embryos (Sep. 2007) ACS Nano, vol. 1, No. 2, 133-143.

Korbekandi, H. et al., (2012) Silver Nanoparticles, The Delivery of Nanoparticles, Dr. Abbass A. Hashim (Ed.), ISBN: 978-953-51-0615-9, InTech, http://www.intechopen.com/books/the-delivery-of-nanoparticles/silver-nanoparticles.

Rashid, M. et al. Synthesis of Silver Nano Particles (Ag-NPs) and their uses for Quantitative Analysis of Vitamin C Tablets, Dhaka Univ. J. Pharm. Sci. 12(1): 29-33, Jun. 2013.

Rivera, P. et al., Synthesis and characterization of silver nanoparticles for biosensor design, Universidad Interamericana de Puerto Rico—Recinto de Ponce, Revista 360° /No. 8/2013.

\* cited by examiner

SOLDER MASK COMPOSITIONS FOR AEROSOL JET PRINTING

CROSS REFERENCE TO RELATED APPLICATIONS

This application is a divisional application of U.S. application Ser. No. 14/595,814, filed Jan. 13, 2015 which is incorporated herein by reference in its entirety

BACKGROUND

Embodiments disclosed herein relate to solder masks such as those employed in the manufacture of printed circuit boards. In particular, embodiments disclosed herein relate to solder mask inks having suitable viscosity for aerosol jet printer application.

Printed circuit boards (PCBs) or printed wiring boards (PWBs) (hereinafter collectively PCB's) are platforms that connect and interface electronic components with each other and with other elements in computers, communication devices, consumer electronics, automated manufacturing and inspection equipment. PCB's may be produced from a base substrate, typically an insulating material, on which a thin copper layer is laminated or plated. Chemical etching is then used to remove areas of the copper to produce electrically conducting paths or traces. The traces permit electrical interconnection of the components attached to the PCB.

An insulative material, referred to as a solder mask, is then applied over the copper conducting paths. Solder masks protect the conducting paths on the PCB from being coated with solder during soldering steps, while leaving uncovered only the conducting pads that need to be contacted with molten solder. The solder mask layer on simple PCBs may be produced using screen-printing or spin-casting techniques. However, more densely populated PCBs typically utilize lithographic techniques to form a patterned solder mask on the copper layer.

Figure 1:
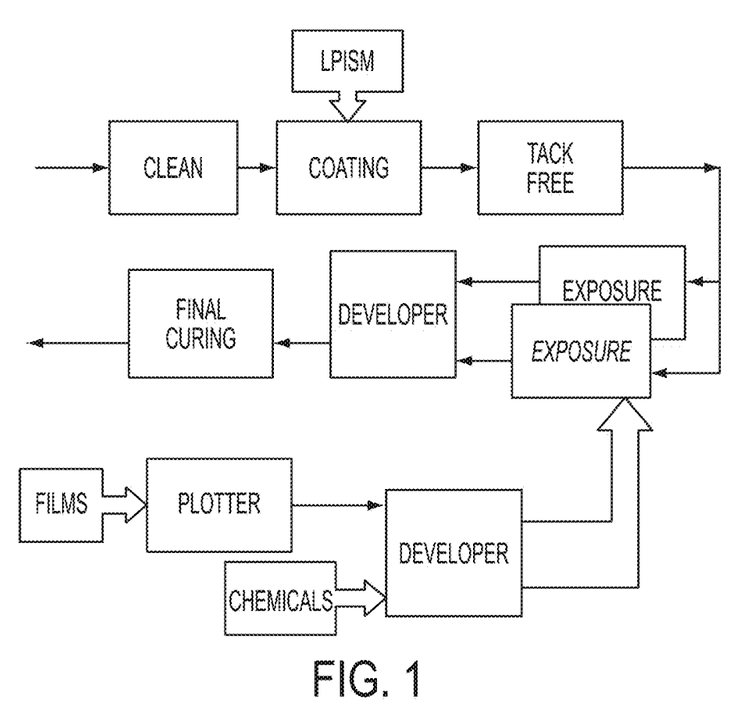
FIG. 1 shows a conventional solder mask deposition process.

Lithographic techniques used to prepare solder masks can involve multi-step sequences that are material and energy-intensive. For example, the process usually involves film coating, lithography, wet etching and curing, as indicated in the flow diagram of FIG. 1. In such a process, the solder masks are often epoxy-based materials that are spin-coated or applied in an analog fashion, followed by subtractive etching. The process tends to deteriorate the chemical and physical resistance of the final cured solder mask. Because the first step of photolithography is non-selective, via holes in PCB are often partially or completely filled with solder mask. Removing the solder mask for high aspect ratio via holes is a very difficult and sometimes impossible task. Ultimately, such methods can be a costly and wasteful.

Although digital methods for depositing solder masks is desirable attempts at inkjet printing, for example, have run up against limitations due to the very low viscosity requirements (less than about 20 cps). By contrast, commercial solder mask resists typically have very high viscosities (greater than about 10,000 cps), and thus, inkjet printing solder mask systems are difficult to put into practice.

Alternatively, screen printing has been developed for depositing solder mask resist. Although it can overcome the via hole plugging issue, screen printing often yields solder masks with low resolution and poor registration. In addition, screen printing requires a flat surface. PCBs with relief structures on the surface are not amenable to screen print solder mask thereon. Similarly, solder masks generally cannot be screen printed on curved surfaces or on 3D electronics.

SUMMARY

In some aspects, embodiments herein provide solder mask inks for aerosol jet printing comprising a metal oxide and a propylene glycol-based solvent, wherein the solder mask ink has a viscosity from about 50 cps to about 1,000 cps at shear rate of 10 1/s at 25° C., and a shear thinning index from about 1.0 to about 2.0.

In some aspects, embodiments herein provide solder mask inks comprising: i) a resin or UV curable monomer; ii) an inorganic pigment; and iii) from about 20 to about 50 percent by total weight of the ink of an ether or an ester solvent based on propylene glycol, wherein the solder mask ink formulation has a viscosity from about 50 cps about 800 cps at shear rate of 10 1/s at 25° C., and a shearing thinning index from about 1.0 to about 1.5.

A method comprising aerosol jet printing a solder mask ink in a pattern on a substrate, the solder mask ink comprising: i) a resin or UV curable monomer; ii) an inorganic pigment; and iii) about 20 to about 50 percent by weight of an ether or an ester solvent based on propylene glycol, wherein the solder mask ink has a viscosity from about 50 cps to about 800 cps at shear rate of 10 1/s at 25° C., and a shearing thinning index from about 1 to about 1.5, and curing the jetted solder.

BRIEF DESCRIPTION OF DRAWINGS

Various embodiments of the present disclosure will be described herein below with reference to the figures wherein.

DETAILED DESCRIPTION

Embodiments herein provide solder mask inks suitable for aerosol printing. The solder mask inks generally have viscosities less than about 1000 cps at shear rate of about 10 1/s at 25° C., and a shear thinning index less than about 2.0. In embodiments, the solder mask inks may comprise: i) resin or UV curable monomers; ii) an inorganic pigment, and iii) at least about 20 weight percent of the total weight of the ink, and up to about 50 weight percent of an ether or ester solvent based on propylene glycol, the solder mask inks having a viscosity less than about 800 cps at shear rate of about 10 1/s at 25° C., and a shearing thinning index less than about 1.5. Such solder mask inks demonstrated good printability in aerosol jet printer, and the cured, printed masks exhibited comparable adhesion, pencil hardness, scratch resistance, and chemical resistance as commercial solder masks. Advantageously, the use of aerosol printing of the solder mask inks herein allows for placement of solder mask patterns on irregularly shaped surfaces, in sharp contrast to conventional solder mask formulations.

As used herein, "shear-thinning index" or "STI" is a unitless measurement proportional to the ratio of viscosities of a fluid measured at a low and high speed. In embodiments, the STI is defined as the ratio of viscosity at the shear rate of 10 1/s over the viscosity at the shear rate of 484 1/s at 25° C. Thus, the shear-thinning index is a speed-dependent viscosity ratio. Those skilled in the art will recognize that the STI is sometimes also referred to as a thixotropic index, but this should not be construed as thixotropy.

Without being bound by theory, the benefits of the disclosed solder mask inks may be realized via the high solids content and specific rheology and shear thinning behavior allowing delivery by aerosol jet. In particular, the selection of propylene glycol-based solvents not only decreases the viscosity, but also reduces the shear thinning index of the solder mask inks, thus effectively reducing viscosity at relatively low concentrations. Indeed, dilution of solder mask base materials to aerosol jettable viscosities alone is not sufficient and alternative solvents that provide the requisite viscosity range can cause deposition of very thin layers with pinholes which are inadequate to function as solder masks. Thus, the particular solvents disclosed herein provide not only a desirable viscosity, but also proper shear thinning characteristics to avoid problematic thin layers with pinholes.

Aerosol jet printing with the solder mask inks herein has several other advantages: (1) It is a digital process which significantly simplifies/reduces the process steps, thus reducing the manufacturing cost; (2) Solder mask resists are applied digitally onto the desired area, which reduces materials waste and avoids via holes plugging; (3) Aerosol printing has been demonstrated for printing high resolution (e.g., about 10 micron) making it suitable for high-density solder mask manufacturing; (4) Aerosol printing can handle much higher ink viscosity (up to about 1000 cps), when compared to ink-jet printing; and (5) Aerosol printing has been demonstrated as a suitable method for printing onto 3D surfaces or surfaces with 3D topography relief structures. These are all desirable properties for PCB manufacturing and printing 3D electronics.

In embodiments, the solder mask inks can employ metal oxide-based or other inorganic pigments, in conjunction with the particular enumerated solvents, to provide solder mask inks that do not require the use of surfactants. This is particularly beneficial to realize good performance characteristics of the cured masks, where surfactants can cause some performance deterioration of the resultant mask. In embodiments, white solder mask base materials comprising a metal oxide, such as titanium dioxide, may be particularly suitable for PCB for LED applications.

In embodiments, there are provided solder mask inks for aerosol jet printing comprising a metal oxide and a propylene glycol-based solvent, wherein the solder mask ink has a viscosity from about 50 cps to about 1,000 cps at shear rate of 10 1/s at 25° C., and a shear thinning index from about 1.0 to about 2.0.

As used herein, a "solder mask ink" refers to compositions that are sufficiently fluid to be deposited by aerosol jet printing and which are employed in the formation of solder mask patterns. The solder mask ink can be applied to the copper traces of a printed circuit board (PCB) for protection against oxidation and to prevent solder bridges from forming between closely spaced solder pads. Solder masks are particularly useful in high throughput PCB board production. The solder mask inks may be based on epoxy liquids of appropriate viscosity and shear thinning index for application via aerosol printing methods. The solder mask inks will typically employ either a thermal or UV curable resin.

As used herein, "aerosol jet printing" refers to a process that typically involves atomization of the solder mask ink, which can be optionally heated, producing droplets on the order of one to two microns in diameter. The atomized droplets are typically entrained in a gas stream and delivered to a print head. At the print head, an annular flow of gas is introduced around the aerosol stream to focus the droplets into a tightly collimated beam. The combined gas streams exit the print head through a converging nozzle that compresses the aerosol stream to a small diameter which may be from about 1 micron to about 10 microns. The jet exits the print head and is deposited on a substrate. The resulting patterns can have features ranging from about 5 microns to about 3000 microns wide, with layer thicknesses from tens of nanometers to about 25 microns, including from about 1 micron to about 20 micron.

As used herein, "shear thinning index" refers to a speed-dependent viscosity ratio. It can be obtained by taking a ratio of a viscosity measured at a low speed at 10 1/s, over the viscosity measured at a high speed, at 484 1/s. In an ideal Newtonian fluid, the shear thinning index is close to about 1.0.

In embodiments, the solder mask inks comprise a resin or UV curable monomer. Such resins or UV curable monomers may include, without limitation, a bisphenol A epoxy, a novolak epoxy, an acrylic acid modified epoxy, a cycloaliphatic- or heterocycle-based epoxy, and combinations thereof, the resin being crosslinkable with a phenol, amine, or anhydride. In embodiments, the resin or UV curable monomer may be provided in a solder mask base material, such as commercially available solder mask pastes and the like distributed by Taiyo, America, including those under the product line PSR-4000.

In embodiments, there are provided solder mask inks comprising: i) a resin or UV curable monomer; ii) an inorganic pigment; and iii) from about 20 to about 50 percent by total weight of the ink of an ether or an ester solvent based on propylene glycol; wherein the solder mask ink formulation has a viscosity from about 50 cps to about 800 cps at shear rate of 10 1/s at 25° C., and a shearing thinning index from about 1.0 to about 1.5.

Advantageously, the solder mask inks herein may be formulated without surfactants. Thus, in embodiments, the solder mask is free of surfactant. In some embodiments, solder mask inks may comprise an amount of surfactant that is sufficiently low to have little impact on the physical properties of the cured solder mask. Where surfactants are employed, they may be non-ioinic surfactants. Examples of non-ionic surfactants include polysorbates such as polysorbate 20 (polyoxyethylene (20) sorbitan monolaurate), polysorbate 40 (polyoxyethylene (20) sorbitan monopalmitate), polysorbate 60 (polyoxyethylene (20) sorbitan monostearate), polysorbate 80 (polyoxyethylene (20) sorbitan monooleate); polyglycerol polyricinoleate, Octadecanoic acid [2-[(2R,3S,4R)-3,4-dihydroxy-2-tetrahydrofuranyl]-2- hydroxyethyl] ester, Octadecanoic acid [(2R,3S,4R)-2-[1,2-bis(1-oxooctadecoxy)ethyl]-4-hydroxy-3-tetrahydrofuranyl] ester; C8 to C22 long chain alcohols such as 1-octadecanol, Cetylstearyl alcohol, Hexadecan-1-ol and cis-9-octadecen-1-ol; substituted or unsubtituted octylphenol in which the substituents can include a polyethoxyethanol group (e.g., to form octylphenoxypolyethoxyethanol) or any other substituent that will form a non-ionic surfactant with octylphenol; Polyethylene glycol monoisohexadecyl ether; Dodecanoic acid 2,3-dihydroxypropyl ester; glucosides such as lauryl glucoside, octylglucoside and decyl glucoside; fatty acid amides such as cocamide diethanolamine and cocamide monoethanolamine; and nonionic surfactants that have a hydrophilic polyethylene oxide chain and an aromatic hydrocarbon lipophilic or hydrophilic group, such as Nonoxynol-9 and Triton X-100.

In an embodiment, the non-ionic surfactant is a polyalkylene glycol. For example, the non-ionic surfactant can be a block co-polymer comprising at least one polyethylene glycol block and at least one polypropylene glycol block, such as polyethylene glycol-block-polypropylene glycol-block-polyethylene glycol or a triblock copolymer composed of a central hydrophobic chain of polyoxypropylene (poly(propylene oxide)) flanked by two hydrophilic chains of polyoxyethylene (poly(ethylene oxide)). An example of a commercially available non-ionic surfactant is SYNPERONIC F108, available from Aldrich.

The non-ionic surfactant can be employed in any suitable amount, for example, the amount of non-ionic surfactant can be about 0.01% by weight relative to the total weight of the solder mask ink composition. In other examples, the amount of non-ionic surfactant can range from about 0.05% to about 5%, such as about 0.5% to about 3% by weight relative to the total weight of the ink composition.

In embodiments, the solder mask inks employ a solvent is an ether and/or an ester solvent based on propylene glycol. In some such embodiments, the solvent is propylene glycol monomethyl ether acetate, dipropylene glycol monomethyl ether acetate or combinations thereof. When used in combination the solvent may be a 1:1 combination of propylene glycol monomethyl ether acetate and dipropylene glycol monomethyl ether acetate. In embodiments, solvents comprises about 10 to about 50 weight percent of the solder mask ink, including from about 10 to about 35 wt % for the solder mask ink. In embodiments, the ratio may be from about 9:1 to about 1:9, including from about 7:3 to about 3:7.

In embodiments, solder mask inks may comprise a metal oxide that is an inorganic pigment. In embodiments, the metal oxide is an oxide of titanium. In embodiments, the solder mask ink may comprise any inorganic pigment, including any inorganic metal-based pigments. Aluminum pigments may include, without limitation, Ultramarine (PB29), a complex naturally occurring pigment of sulfur-containing sodio-silicate ($Na_{8-10}Al_6Si_6O_{24}S_{2-4}$), Ultramarine violet (PV15) a silicate of sodium and aluminum containing sulfur. Copper pigments may include, without limitation, Scheele's Green: copper arsenite $CuHAsO_3$, $Cu(C_2H_3O_2)_2.3Cu(AsO_2)_2$, Paris Green: copper(II) acetoarsenite, Egyptian Blue, a synthetic pigment of calcium copper silicate ($CaCuSi_4O_{10}$), Han Blue: $BaCuSi_4O_{10}$, Han Purple: $BaCuSi_2O_6$. Cobalt pigments may include, without limitation, Aureolin (also called Cobalt Yellow) (PY40): Potassium cobaltinitrite ($Na_3Co(NO_2)_6$, Cobalt Blue (PB28) and Cerulean Blue (PB35): cobalt(II) stannate, Cobalt Violet: (PV14) cobaltous orthophosphate. Manganese pigments may include, without limitation, Manganese violet: $NH_4MnP_2O_7$ (PV16) Manganese ammonium pyrophosphate, Iron pigments may include, without limitation, Iron black (PBk11) (C.I. No. 77499): $Fe_3O_4$, Yellow Ochre (PY43): a naturally occurring clay of hydrated iron oxide ($Fe_2O_3.H_2O$), Prussian Blue (PB27): a synthetic pigment of ferric hexacyanoferrate ($Fe_7(CN)_{18}$). Venetian Red, Oxide Red (PR102), Red Ochre (PR102): anhydrous $Fe_2O_3$, Burnt Sienna (PBr7): a pigment produced by heating Raw Sienna, Clay earth pigments (naturally formed iron oxides), Raw Umber (PBr7): a natural clay pigment consisting of iron oxide, manganese oxide and aluminum oxide: $Fe_2O_3$+$MnO_2$+$nH_2O$+Si+$AlO_3$. When calcined (heated) it is referred to as Burnt Umber, Raw Sienna (PBr7): a naturally occurring yellow-brown pigment from limonite clay. Cadmium pigments may include, without limitation, Cadmium Orange (PO20): an intermediate between cadmium red and cadmium yellow: cadmium sulfoselenide, Cadmium Yellow (PY37): cadmium sulfide (CdS), Cadmium Red (PR108): cadmium selenide (CdSe), Cadmium Green: a light green pigment comprising a mixture of Cadmium Yellow (CdS) and Viridian ($Cr_2O_3$), Chromium pigments may include, without limitation, Chrome Orange: a naturally occurring pigment mixture composed of lead(II) chromate and lead(II) oxide. ($PbCrO_4$+PbO), Chrome Yellow (PY34): natural pigment of lead(II) chromate ($PbCrO_4$), Chrome green (PG17): chromium oxide ($Cr_2O_3$), Viridian (PG18): a dark green pigment of hydrated chromium(III) oxide ($Cr_2O_3$), Arsenic pigments may include, without limitation, Orpiment natural monoclinic arsenic sulfide ($As_2S_3$). Lead pigments may include, without limitation, Cremnitz White (PW1): basic plumbous carbonate (($PbCO_3$)$_2$.Pb(OH)$_2$), Red Lead: lead tetroxide, $Pb_3O_4$, Naples Yellow (PY41). Titanium pigments may include, without limitation, Titanium White (PW6): titanic oxide ($TiO_2$), Titanium Black, Titanium Yellow (PY53). Tin Pigments may include, without limitation, Mosaic gold: stannic sulfide ($SnS_2$). Mercury pigments may include, without limitation, Vermilion (PR106), Mercuric sulfide (HgS). Antimony pigments may include, without limitation, Antimony White: stibous oxide ($Sb_2O_3$), Barium pigments may include, without limitation, Barium sulfate (PW5), Zinc pigments may include, without limitation, Zinc White (PW4): Zinc Oxide (ZnO).

In embodiments, the inorganic pigment is selected from the group consisting of a metal oxide, metal sulfate, metal sulfide, metal borate, azurite, aureolin, cobalt blue, chrome yellow, cerulean, calcium chromate, bice cobalt green, Egyptian blue, han purple, han blue, lithopone, manganese violet, Prussian blue, ultramarine, venetian ceruse, verdigris, vermilion, and viridian In particular embodiments, the inorganic pigment may be a metal oxide. In some such embodiments, the metal oxide may be an oxide of titanium, such as titanium dioxide. Such titanium based pigments are commonly employed in white solder mask base materials. In embodiments, white solder base mask materials unexpectedly perform better than green solder base mask materials, though green solder base mask materials may also be used. In embodiments, the metal oxide is an oxide of titanium, antimony trioxide, chromium oxide, manganese dioxide, or lead oxide, or combinations thereof.

Metal oxide based pigments, in particular, exhibit an unexpectedly good performance in the cured solder masks. Without being bound by theory, this may be due to the interactions between the metal and the propylene-glycol-based solvents. Combinations of such pigments and solvents appear to be at least partially responsible for the observed shear thinning index. Thus, white pigment based on titanium dioxide provides low shear thinning index as demonstrated below in the Examples. The same level of performance enhancement is not observed for a typical green solder base material, even where the paste-like carrier vehicle for the pigment is the same. Thus, the carrier vehicle itself does not appear to be the determinative factor in the resultant shear thinning index.

In embodiments, there are provided methods comprising aerosol jet printing a solder mask ink in a pattern on a substrate, the solder mask ink comprising: i) a resin or UV curable monomer; ii) an inorganic pigment; and iii) from about 20 to about 50 percent by total weight of the ink of an ether or an ester solvent based on propylene glycol; wherein the solder mask ink has a viscosity from about 50 cps to about 800 cps at shear rate of 10 1/s at 25° C., and a shearing thinning index from about 1.0 to about 1.5; and curing the jetted solder. In embodiments, the curing step is a thermal of UV curing step.

In some embodiments, solder mask inks herein, when cured may exhibit a film integrity, as measured by the industrial standard set forth in IPC-SM-840C and its amendment. Some non-limiting exemplary properties of the cured solder masks include pencil hardness, dimensional stability, adhesion, chemical resistance, flammability, solderability.

Pencil Hardness:

This test is designed to evaluate the hardness of the solder mask surface and its resistance to abrasion. The test is carried out on three IPC-B-25A boards coated with solder mask and cured according to the manufacture's specified application and curing requirements. The board is placed on a firm horizontal surface. The hardest pencil (Eagle Turquoise brand ranging from 6H to 4B) is selected and is held firmly against the solder mask at a 45 degree angle. The pencil is then pushed away from the operator with uniform downward and forward pressure in a ¼ inch stroke. If the solder mask is cut or gouged then the next softest pencil is used until one is found which will not cut into the mask. The pencil hardness is then recorded which did not cut or gouge the solder mask. In embodiments, the cured solder masks herein exhibit a scratch resistance 4-5B and pencil hardness 5-6H.

Embodiments disclosed herein also provide, in part, printed circuit boards comprising conductive patterns disposed on an insulating substrate and a cured solder mask disposed on at least a portion of the conductive pattern, wherein the cured solder mask is formed from a solder mask inks described herein above.

Printed circuit boards may be manufactured by conventional techniques and may include glass as the insulating substrate over which a copper laminate sheet is disposed. In some embodiments, the insulating substrate may comprise a rigid or flexible structure. In some embodiments, the insulating substrate is one selected from a glass or a plastic resin.

In embodiments, the conductive pattern may be formed directly on the insulating substrate. In other embodiments, a solder mask may be disposed on the copper laminate sheet and the conductive pattern formed on top of the solder mask. In embodiments, a conductive pattern may be disposed on one or both sides of an insulating substrate and in either case a solder mask may be disposed on one or both sides of the insulating substrate.

In some embodiments, the conductive pattern of a printed circuit board may itself be provided by way of a conductive ink. In such embodiments, the conductive ink may be disposed directly on the insulating substrate obviating the need to etch a conductive copper-based pattern from a copper laminate sheet. Where conductive inks are employed, the conductive ink may be disposed on the substrate with the aid of an inkjet printer and subsequently, the solder mask may be printed over the conductive ink. Conductive inks generally comprise conductive particles dispersed in a carrier fluid. For example, silver nanoparticles and other organic-stabilized metal nanoparticles disclosed in U.S. Patent Application No. 2011/0305821, which is incorporated herein by reference in its entirety, may be employed in such conductive inks.

PCBs intended for challenging environments may further comprise a conformal coating which is applied by dipping or spraying after the components have been soldered. In some embodiments, such coatings may prevent, inter alia, corrosion and leakage currents or shorting due to condensation. In some embodiments, the conformal coating comprises at least one of a wax, a silicone rubber, a polyurethane, an acrylic resin, and an epoxy resin. PCBs may further be configured with protective antistatic agents.

Embodiments disclosed herein also provide, in part, methods of printing solder masks comprising incorporating a solder mask ink into an aerosol jet printing apparatus, causing droplets of melted solder mask ink to be ejected onto a printed circuit board to form a patterned solder mask on the printed circuit board; and curing the patterned solder mask.

In some such embodiments the curing step may be catalyzed by one or more photoinitiators present in the solder mask ink. Thus, after printing of the solder mask ink, the patterned mask may be cured by exposure to light, such as UV light. In some embodiments, light curing may be performed with over a large spectrum of light including UV, IR, near-IR, and visible light. In embodiments, thermal curing is used in lieu of UV curing.

In embodiments, printing methods may include printing of a conductive pattern with a conductive ink prior to printing the solder mask. In some embodiments, printing solder masks may be performed substantially simultaneously with printing of the conductive pattern. This may be achieved, for example, with a tandem printhead with multiple resevoirs that could alternate between printing insulator and conductor on the same substrate.

The following Examples are being submitted to illustrate embodiments of the present disclosure. These Examples are intended to be illustrative only and are not intended to limit the scope of the present disclosure. Also, parts and percentages are by weight unless otherwise indicated. As used herein, "room temperature" refers to a temperature of from about 20° C. to about 25° C.

EXAMPLES

Example 1

This example describes the preparation and testing of solder mask inks suitable for aerosol jet printing application.

Commercial white solder mask resist (Taiyo PSR-4000 LEW1) was purchased from Taiyo America Inc. This solder mask paste is UV curable, but thermally curable materials could be used as well.

Control Example A

The commercial base solder mask paste was characterized first. It showed a viscosity of 35,018 cps at a low shear rate of 10 1/s, and 7490 cps at a high shear rate of 484 1/s at 25° C. The shear thinning index, which is the ratio of the viscosity at low shear to the viscosity at high shear, was calculated to be 4.68. The viscosity is too high for aerosol jet printing. In accordance with embodiments herein, this commercial solder mask was modified to achieve a target viscosity less than 1,000 cps at the low shear rate of 10 1/s at 25° C. by using the enumerated solvents disclosed herein. As the commercial paste has a high shear thinning index, it was desired to identify solvents that can not only decrease the viscosity of the original solder mask formulation, but also reduce the shear thinning index so that the solvents effectively reduce the viscosity down at low shear rate below 1,000 cps.

The commercial solder mask paste was coated into thin film. After UV curing with the recommended conditions, the scratch resistance was measured to be 4-5 B, and the pencil hardness was 6H which is the highest rating for solder mask. In formulating the commercial paste into composition for aerosol jet printing the final ink ideally has no side effects on the final cured properties such as scratch resistance, pencil hardness, and the like. Moreover, the inks should facilitate formation of aerosols for printing, for example, ideally exhibiting a relatively high boiling point and low vapor pressure.

Control Example B

Following designs commonly used to formulate green solder masks, the white solder mask paste employed above was first diluted with alcohol solvent butyl carbitol, in combination with a small amount of non-ionic surfactant (Synperonic F 108). Upon adding 25 weight percent butyl carbitol, the viscosity decreased dramatically to 436 and 555 cps at the shear rate of 484 and 10 1/s, respectively. The composition was first coated on a copper substrate to test the adhesion and hardness. After UV curing, scratch resistance of 3-4B and pencil hardness of 2-3H were observed, significantly worse than Control Example 1.

Working Example 1

Figure 2:
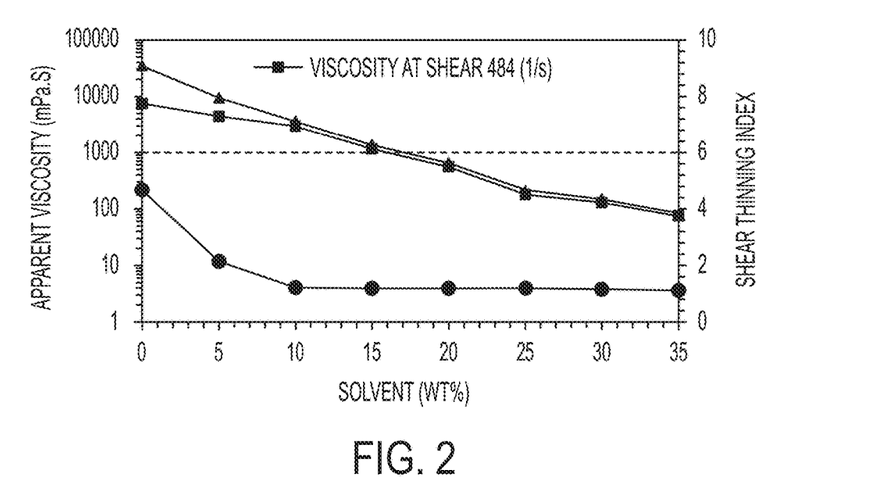
FIG. 2 shows a dual plot of viscosity (at 25° C.) and shear thinning index of an exemplary solder mask in accordance with embodiments herein as a function of solvent addition. The shear thinning index is the ratio of viscosity at low shear of 10 1/s to the viscosity at high shear of 484 1/s.

Because solvent can be evaporated substantially completely, it was postulated that addition of the non-ionic surfactant, Synperonic F108, in Control Example B led to deterioration of the pencil hardness of the final cured solder mask. In the course for searching aerosol compatible solder mask inks, a solvent only formulation was sought. It was unexpectedly found that ether and ester solvents based on propylene glycol provided excellent performance in aerosol jet-compatible solder mask inks. FIG. 2 shows the viscosity (at 25° C.) and shear thinning index of the new white solder mask ink as a function of the amount of propylene glycol monomethyl ether acetate (PGMEA) and dipropylene glycol monomethyl ether acetate (DPGMEA) solvent mixture (PG-MEA and DPGMEA are at 1:1 ratio). This solvent mixture decreased the viscosity very effectively. At 25 weight percent solvent, the viscosity decreased dramatically to 179 and 214 cps at the shear rate of 484 and 10 1/s, respectively, significantly lower than the Control Example B. More importantly, the shear thinning index was reduced dramatically, from 4.68 for the commercial solder mask to 1.1-1.2. This helped to reduce the viscosity at low shear rate rapidly.

Figure 3:
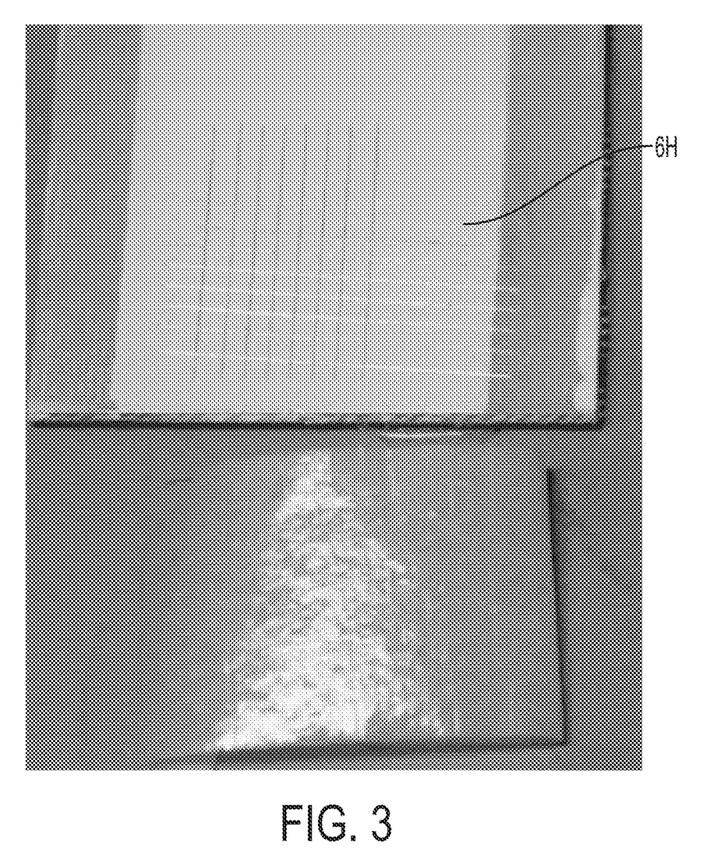
FIG. 3 shows a scratch resistance and adhesion test of an exemplary solder mask in accordance with embodiments herein formulated with a combination of propylene glycol monomethyl ether acetate and dipropylene glycol monomethyl ether acetate (PGMEA/DPGMEA). No material was transferred to the tape, indicating an excellent adhesion of 5B. The pencil hardness was 6H, the highest rating for a solder mask.

After adding the solvent, the low viscosity formulation was first coated on copper cladded FR-4 substrate to test the film forming property. FIG. 3 shows the coated film with a formulation having 30 weight percent PGMEA/DPGMEA. A smooth film was observed with excellent wetting properties on the copper surface. After UV curing, scratch resistance of 5B and pencil hardness of 6H were observed, which results are similar to those of the undiluted commercial paste (Control Example A). The results indicate that the use of solvent mixture of PGMEA/DPGMEA had no adverse effect on the properties of the final cured solder mask. Table 1 below summarizes the difference among different formulations, including scratch resistance and pencil hardness of the white solder mask ink cured coating of the different formulations.

TABLE 1

| Samples | Solvent Addition | Scratch Resistance | Pencil Hardness |
|---|---|---|---|
| Control A | None | 4-5 B | 6H |
| Control B | Butyl carbitol | 3-4 B | 2-3H |
| Working Example 1 | PGMEA/DPGMEA | 5 B | 6H |

Working Example 2

Figure 4A:
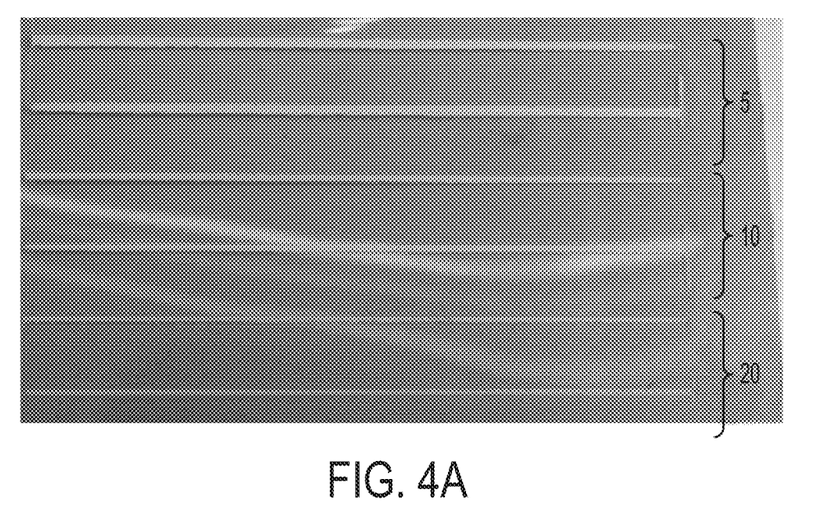
FIG. 4A shows an image of a cured exemplary solder mask in accordance with embodiments herein printed on polyethylene terephthalate (PET) substrate at different speeds (5.0 mm/s, 10 mm/s and 20 mm/s).
Figure 4B:
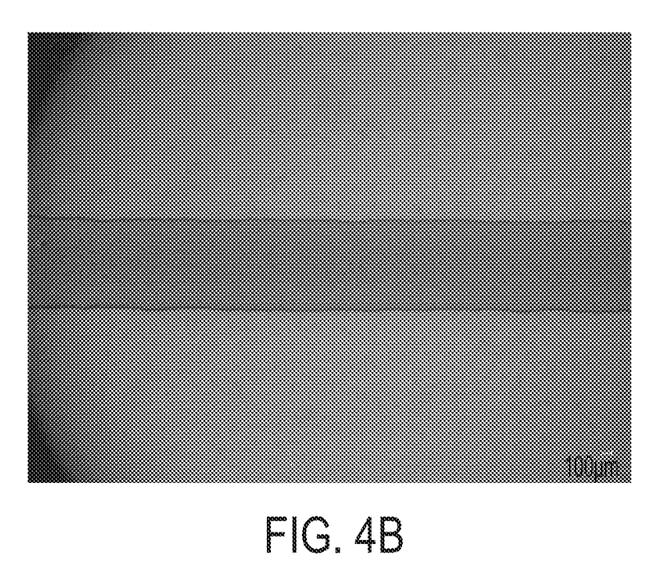
FIG. 4B shows an optical image of a line printed at 10 mm/s from FIG. 4A; the line exhibits smooth edges.

The formulation in Working Example 1 was printed with an aerosol printer equipped with a pneumatic atomizer at about 50° C. The atomization gas was set at 1,000 to 1,300 Standard Cubic Centimeters per Minute (SCCM), the exhaust was at 900 to 1,200 SCCM and the sheath gas was at 200 to 600 SCCM. Aerosol was generated at such printing conditions via a mist-generating probe that was refined with a virtual impactor. The mist steam was then focused using a flow of nitrogen gas. The ink was printed on both PET and copper cladded FR-4 (typical substrate for PCB) substrates. FIG. 4 shows solder mask lines printed at different speed from 5.0 mm/s to 20 mm/s. Uniform lines were observed with well-defined line edges. The printed lines showed excellent adhesion, scratch resistance and chemical resistance as was observed above.

It should be noted that aerosol jettable solder mask inks can be formulated directly from epoxy resins, pigments, and solvents, with entirely optional surfactants, adhesion promoters, and/or other additives. Thus, the working Examples herein are not so limited to the use of commercial solder mask as the starting base materials, although they form a very convenient starting point.

What is claimed is:

1. A solder mask ink for aerosol jet printing comprising a metal oxide and a propylene glycol-based solvent, wherein the solvent is a 1:1 combination of solvents propylene glycol monomethyl ether acetate and dipropylene glycol monomethyl ether acetate and further wherein the solder mask ink has a viscosity from about 50 cps to about 1,000 cps at shear rate of 10 1/s at 25° C., and a shear thinning index from about 1.0 to about 2.0.

2. The solder mask in of claim 1, wherein the metal oxide is an oxide of titanium, antimony trioxide, chromium oxide, manganese dioxide, or lead oxide.

3. The solder mask ink of claim 1, further comprising a resin or UV curable monomer.

4. The solder mask of claim 3, wherein the resin or UV curable monomer is selected from the group consisting of a bisphenol A epoxy, a novolak epoxy, an acrylic acid modified epoxy, a cycloaliphatic- or heterocycle-based epoxy, and combinations thereof, the resin being crosslinkable with a phenol, amine, or anhydride.

5. The solder mask ink of claim 1, wherein the metal oxide is an inorganic pigment.

6. The solder mask ink of claim 5, wherein the inorganic pigment is selected from the group consisting of a metal oxide, metal sulfate, metal sulfide, metal borate, azurite, aureolin, cobalt blue, chrome yellow, cerulean, calcium chromate, bice cobalt green, Egyptian blue, han purple, han blue, lithopone, manganese violet, Prussian blue, ultramarine, venetian ceruse, verdigris, vermilion, and viridian.

7. The solder mask ink of claim 1, wherein the metal oxide is an oxide of titanium, antimony trioxide, chromium oxide, manganese dioxide, or lead oxide.

8. The solder mask ink of claim 1, wherein the 1:1 combination solvents comprises about 10 to about 50 weight percent of the solder mask ink.

9. The solder mask ink of claim 8, wherein the 1:1 combination solvents comprises about 20 to about 35 weight percent of the solder mask ink.

10. A solder mask ink comprising:
   i) a resin or UV curable monomer;
   ii) a metal oxide;
   iii) a surfactant; and
   iv) from about 10 to about 50 percent by total weight of the ink of an ether solvent based on propylene glycol, wherein the solvent is a 1:1 combination of solvents propylene glycol monomethyl ether acetate and dipropylene glycol monomethyl ether acetate; and
   further wherein the solder mask ink formulation has a viscosity from about 50 cps about 800 cps at shear rate of 10 1/s at 25° C., and a shearing thinning index from about 1.0 to about 2.0.

11. The solder mask ink of claim 10, wherein the metal oxide is an oxide of titanium, antimony trioxide, chromium oxide, manganese dioxide, or lead oxide.

12. The solder mask ink of claim 10, wherein the metal oxide is an inorganic pigment selected from the group consisting of a metal oxide, metal sulfate, metal sulfide, metal borate, azurite, aureolin, cobalt blue, chrome yellow, cerulean, calcium chromate, bice cobalt green, Egyptian blue, han purple, han blue, lithopone, manganese violet, Prussian blue, ultramarine, venetian ceruse, verdigris, vermilion, and viridian.

13. The solder mask in of claim 10, wherein the surfactant is non-ionic.

14. The solder mask ink of claim 10, wherein the surfactant is present in an amount of from about 0.5% to about 3.0%.

15. The solder mask ink of claim 10, wherein the surfactant is present in an amount of less than 0.01%.

16. A method comprising:
   aerosol jet printing a solder mask ink in a pattern on a substrate, the solder mask ink comprising:
   a metal oxide; and
   a propylene glycol-based solvent, wherein the solvent is a 1:1 combination of solvents propylene glycol monomethyl ether acetate and dipropylene glycol monomethyl ether acetate and
   further wherein the solder mask ink has a viscosity from about 50 cps to about 1,000 cps at shear rate of 10 1/s at 25° C., and a shear thinning index from about 1.0 to about 2.0; and
   curing the jetted solder.

17. The method of claim 16, wherein the shear thinning index is from about 1.0 to about 1.5.

18. The method of claim 16, wherein the curing step is a thermal of UV curing step.

19. The method of claim 16, wherein the inorganic pigment comprises titanium dioxide.

20. The method of claim 16 having a scratch resistance 4-5B and pencil hardness 5-6H.

* * * * *